United States Patent
Kato (10) Patent No.: US 10,902,057 B2
(45) Date of Patent: Jan. 26, 2021

(54) IMAGE PROCESSING APPARATUS AND METHOD OF CONTROLLING THE SAME

(71) Applicant: CANON KABUSHIKI KAISHA, Tokyo (JP)

(72) Inventor: Keita Kato, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 93 days.

(21) Appl. No.: 16/127,955

(22) Filed: Sep. 11, 2018

(65) Prior Publication Data

US 2019/0079955 A1 Mar. 14, 2019

(30) Foreign Application Priority Data

Sep. 14, 2017 (JP) ................................ 2017-176649

(51) Int. Cl.
| | |
|---|---|
| G06K 9/00 | (2006.01) |
| G06F 16/58 | (2019.01) |
| G06T 1/00 | (2006.01) |
| G06K 9/20 | (2006.01) |
| G11B 27/02 | (2006.01) |
| G06F 16/41 | (2019.01) |
| G06T 11/60 | (2006.01) |

(52) U.S. Cl.
CPC .......... *G06F 16/5866* (2019.01); *G06F 16/41* (2019.01); *G06K 9/2054* (2013.01); *G06T 1/0007* (2013.01); *G06T 11/60* (2013.01); *G11B 27/02* (2013.01)

(58) Field of Classification Search
None
See application file for complete search history.

(56) References Cited

U.S. PATENT DOCUMENTS

| | | | | |
|---|---|---|---|---|
| 6,631,239 | B1 * | 10/2003 | Hamada ................. | G06T 11/60 360/13 |
| 8,325,398 | B2 * | 12/2012 | Satomi ................. | G11B 27/034 358/1.15 |
| 2006/0170704 | A1 * | 8/2006 | Kotani ................... | G06T 11/60 345/619 |
| 2007/0097147 | A1 * | 5/2007 | Inata ...................... | G06T 11/60 345/619 |

(Continued)

FOREIGN PATENT DOCUMENTS

| | | |
|---|---|---|
| JP | 2006-209543 A | 8/2006 |
| JP | 2013058970 A * | 3/2013 |

*Primary Examiner* — Delomia L Gilliard
(74) *Attorney, Agent, or Firm* — Cowan, Liebowitz & Latman, P.C.

(57) ABSTRACT

The present invention can, in relation to a single image file including a plurality of original images, record an image file including editing information that represents original image editing content while maintaining the original images. For doing so, an image processing apparatus that performs editing processing in relation to an image file that includes a plurality of images, comprises an editing unit configured to edit an original image in an image file that includes a plurality of original images and generate editing information for reproducing a post-editing image from the original image, and a recording unit configured to, by adding the editing information generated by the editing unit to the image file, record the editing information in the image file.

9 Claims, 7 Drawing Sheets

(56) References Cited

U.S. PATENT DOCUMENTS

2009/0041390 A1* 2/2009 Kuwata .................. G06T 11/60
  382/311
2009/0147131 A1* 6/2009 Mikawa ................. G11B 27/34
  348/445
2009/0245666 A1* 10/2009 Yamashina ........ H04N 1/00461
  382/235

* cited by examiner

IMAGE PROCESSING APPARATUS AND METHOD OF CONTROLLING THE SAME

BACKGROUND OF THE INVENTION

Field of the Invention

The present invention relates to a technique for recording editing information to an image file including a plurality of pieces of image data.

Description of the Related Art

An image processing apparatus that can apply editing which is instructed by a user to image data is known. However, when original image data has been changed by such editing being applied, it is not possible to return to a state prior to applying the editing, and editing cannot be reapplied from an initial state. Japanese Patent Laid-Open No. 2006-209543 (hereinafter, D1) discloses a technique in which in view of such circumstances, pre-editing original image data and image editing information are collected and recorded as a post-editing image file.

However, in the configuration of the foregoing D1, there is a problem in that in the case where a plurality of pieces of image data are recorded as a single image file, it is not possible to comprehensively manage editing information of the plurality of pieces of image data.

SUMMARY OF THE INVENTION

The present invention was conceived in view of such issues, and provides a technique in which, in relation to a single image file including a plurality of original images, an image file including editing information that represents original image editing content is recorded while maintaining the original images.

According to an aspect of the invention, there is provided an image processing apparatus that performs editing processing in relation to an image file, the apparatus comprising: an editing unit configured to edit an original image in an image file that includes a plurality of original images and generate editing information for reproducing a post-editing image from the original image; and a recording unit configured to, by adding the editing information generated by the editing unit to the image file, record the editing information in the image file.

By virtue of the present invention, it becomes possible to, in relation to a single image file including a plurality of original images, record an image file including editing information that represents original image editing content while maintaining the original images.

Further features of the present invention will become apparent from the following description of exemplary embodiments (with reference to the attached drawings).

DESCRIPTION OF THE EMBODIMENTS

Hereinafter, embodiments according to the present invention will be described in detail in accordance with the accompanying drawings. An apparatus of the present embodiment, in relation to an image file in which a plurality of pieces of image data are recorded as a single file, performs image editing according to an operation by a user, and generates a post-editing image file using the editing information and the original image file. A concrete example thereof will be described below.

Figure 1:
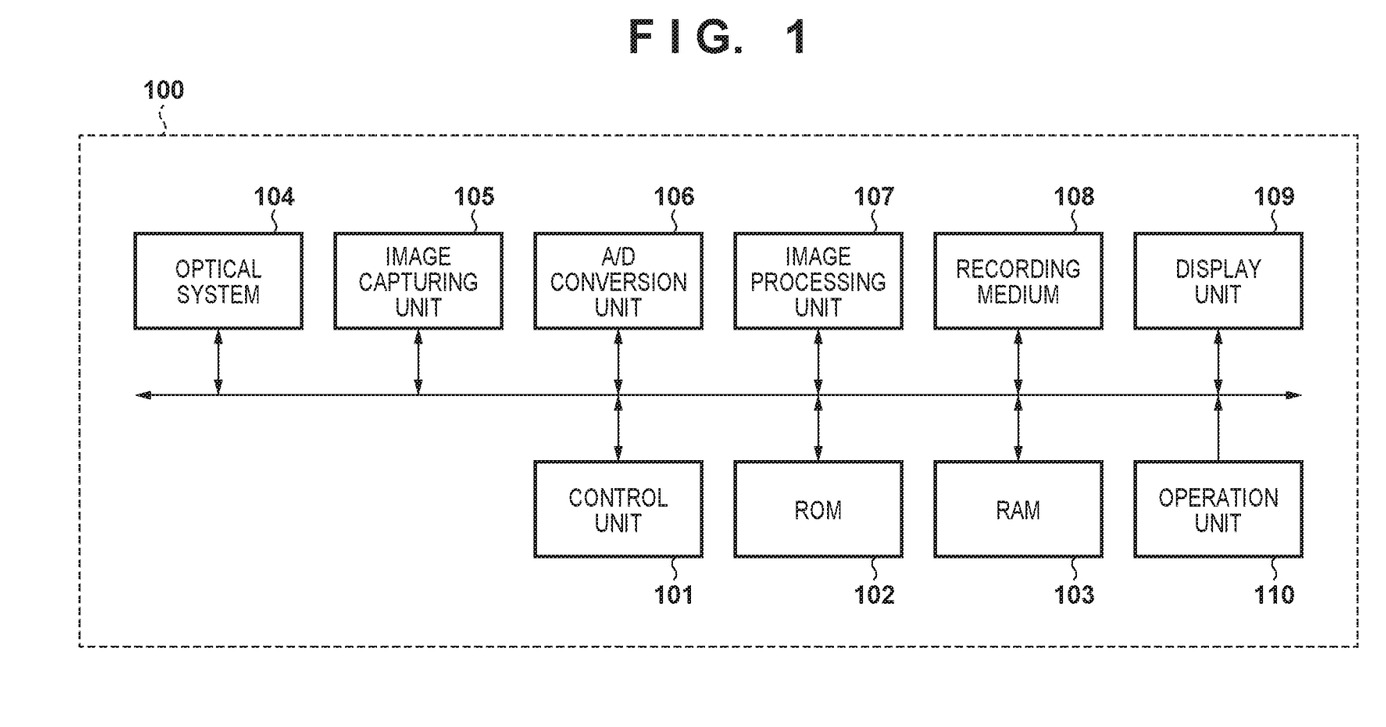
FIG. 1 is a block configuration diagram of an image processing apparatus in an embodiment.

FIG. 1 is a block configuration diagram for an image capturing apparatus 100 in which an image editing function in the embodiment is implemented. Constituent elements and operation thereof will be described below.

A control unit 101 is, for example, a CPU, and reads, from a later-described ROM 102, operation programs for each block that the image capturing apparatus 100 comprises, loads them into a later-described RAM 103, and executes them to thereby control operation of the respective blocks that the image capturing apparatus 100 comprises. The ROM 102 is a read-only memory, and in addition to operation programs of each block that the image capturing apparatus 100 comprises, stores parameters necessary for operation of the respective blocks and the like. Note that it is sufficient that stored content is maintained even when the power of the apparatus is turned OFF, and therefore a rewritable, non-volatile memory may also be used in place of the ROM. The RAM 103 is a rewritable, volatile memory, and is used as a region for storing programs that the control unit 101 executes and a temporary storage region for data outputted in the operation of the respective blocks that the image capturing apparatus 100 comprises.

An optical system 104 is configured by a lens group including a zoom lens and a focus lens, and forms an image of a subject on a later-described image capturing unit 105. The image capturing unit 105 is an image capturing device such as a CCD or a CMOS sensor, for example, and photo-electrically converts an optical image formed on the image capturing unit 105 by the optical system 104, and outputs the obtained analog image signal to an A/D conversion unit. An A/D conversion unit converts an inputted analog image signal into a digital image signal, and outputs the obtained digital image data to the RAM 103.

An image processing unit 107 applies various image processing, such as a white balance adjustment, color interpolation, and gamma processing to image data that has been stored in the RAM 103. Also, the image processing unit 107 is equipped with a later-described image editing unit 200, and edits an image in relation to an image file including a plurality of pieces of image data that has been stored in the RAM 103.

A recording medium 108 is a detachable memory card or the like, and image data that was processed in the image processing unit 107 is recorded as a recorded image via the RAM 103. Also, an image that has been recorded in the recording medium 108 can be outputted to the image processing unit 107 via the RAM 103.

A display unit 109 is a display device such as an LCD, and displays images recorded in the RAM 103 and the recording medium 108 and a user interface to present to a user. An operation unit 110 includes various buttons and switches, such as a shutter-release button, and also a touch panel which accept input of an instruction from a user.

This concludes the description of the configuration and basic operation of the image capturing apparatus 100. Next, the operation of the image processing unit 107 which is a feature of the present embodiment will be described.

In the image capturing apparatus 100 in the present embodiment, when a user operates the operation unit 110 to select "continuous capturing mode & integration into a single file" from out of various capturing modes, and performs a capture, a plurality of captured images obtained by continuous capturing (consecutive capturing) are respectively encoded, and recorded (saved) in the recording medium 108 as a single image file. Details will be described later, but information, as a flag, representing the existence or absence of editing information and information indicating a storage address of index information are allocated in a header of the image file that is generated at this time, and information indicating that there is no editing information, and information indicating a dummy storage address are stored therein. This is in order to configure such that the image data file recorded in the storage unit 108 is used as is and so the size of the file header is not changed by the later-described editing processing (in order to make processing for shifting data in the image data file unnecessary).

Also, it is possible to edit an image file stored in the recording medium 108 via the operation unit 110. Also, each piece of image data stored in a single image file is assumed to be encoded by encode processing as typified by JPEG, for example.

Below is a description of an example of processing in a case where an image file that is an editing target includes a plurality of pieces of image data, wherein image editing is performed in accordance with an instruction by a user, and a post-editing image file is generated by using editing information and the original image file thereof.

First, an example of a configuration of the image editing unit 200 that the image processing unit 107 is equipped with will be described with reference to FIG. 2. The image editing unit 200, in accordance with an instruction by a user from the operation unit 110, performs image editing in relation to an image file recorded in the recording medium 108.

Figure 2:
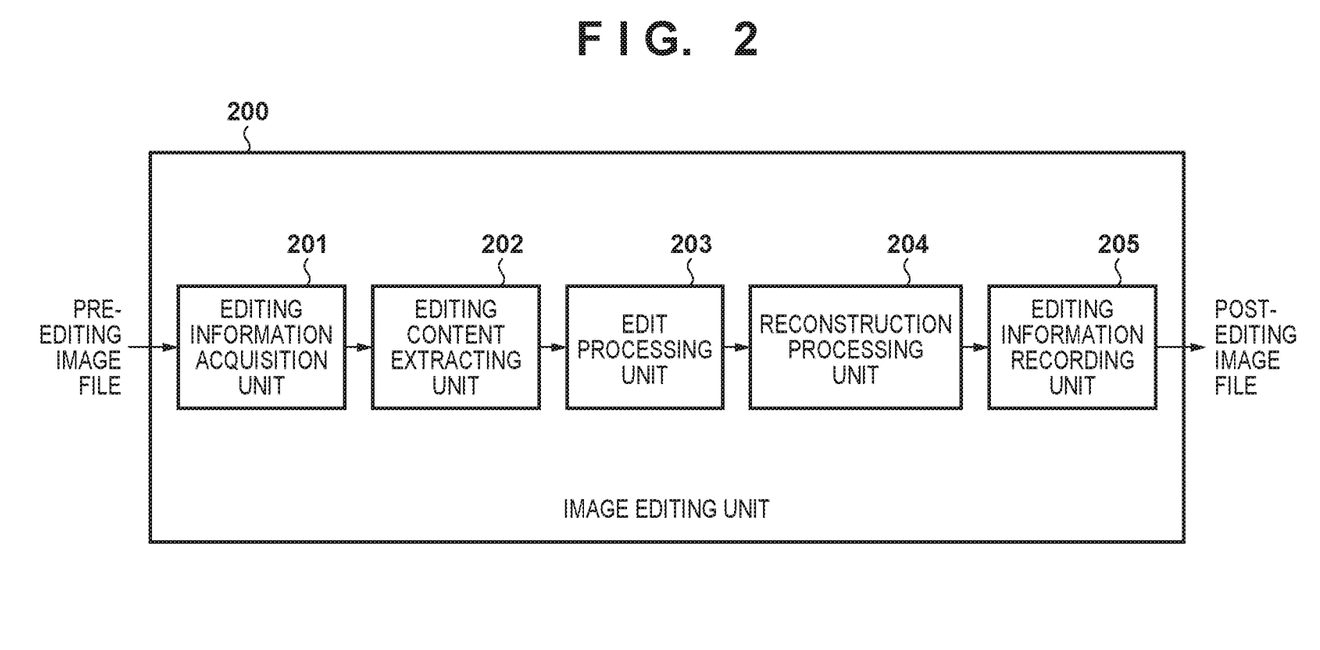
FIG. 2 is a block configuration diagram of an image editing unit.

FIG. 2 is a view illustrating an example of a configuration of the image editing unit 200. The image editing unit 200 is configured by an editing information acquisition unit 201, an editing content extracting unit 202, an edit processing unit 203, a reconstruction processing unit 204, and an editing information recording unit 205.

Next, processing for each constituent element of image editing unit 200 will be described in more detail with reference to the flowchart of FIG. 3. Note that the description assumes that the user has already operated the operation unit 110 to perform selection of an image file to be edited from out of the image files that have been stored in the recording medium 108.

<Image File Editing Information Acquisition>

Figure 3:
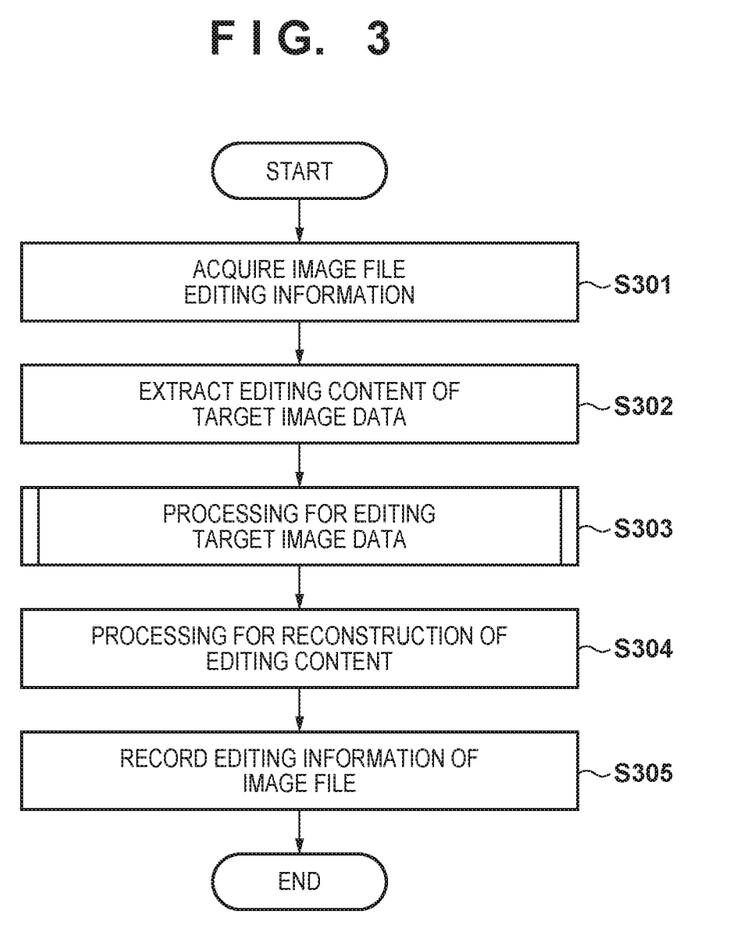
FIG. 3 is a flowchart illustrating a processing procedure of the image editing unit.

In step 301 of FIG. 3, the editing information acquisition unit 201 analyzes the header of the image file that the user selected and that has been recorded in the recording medium 108, and based on the analysis result, determines whether or not editing information has been added within the selected image file. This determination can be a determination made based on a value of a flag described previously. Next, in the case where it is determined that editing information has been added, the editing information acquisition unit 201 extracts the editing information from the selected image file and stores it in the RAM 103. The editing information is configured by: index information by which it is possible to determine whether or not there is editing information for each image and which stores a storage address that describes editing content or the like; and editing content information which describes the actual editing content (will be described later).

Note that, as described previously, in the first operation for selecting an image file obtained in capturing processing, there is no editing information in the selected image file. In other words, the determination as to whether or not editing information is included in the image file can be said to be equivalent to a determination as to whether that image file is being edited for the second or more time or this is the first time.

Also, in the case where it is determined that there is no editing information in the selected image file, the editing information acquisition unit 201 allocates in the RAM 103 a region for storing index information indicating that no editing has been performed for all image data included in the selected image file.

<Target Image Data Editing Content Extraction>

In step 302 of FIG. 3, the editing content extracting unit 202 extracts editing content of target image data on which editing is to be performed from the editing information for the image file recorded in the RAM 103, and records it in the RAM 103. Here, the target image data editing content extraction method will be described with reference to FIG. 4.

Figure 4:
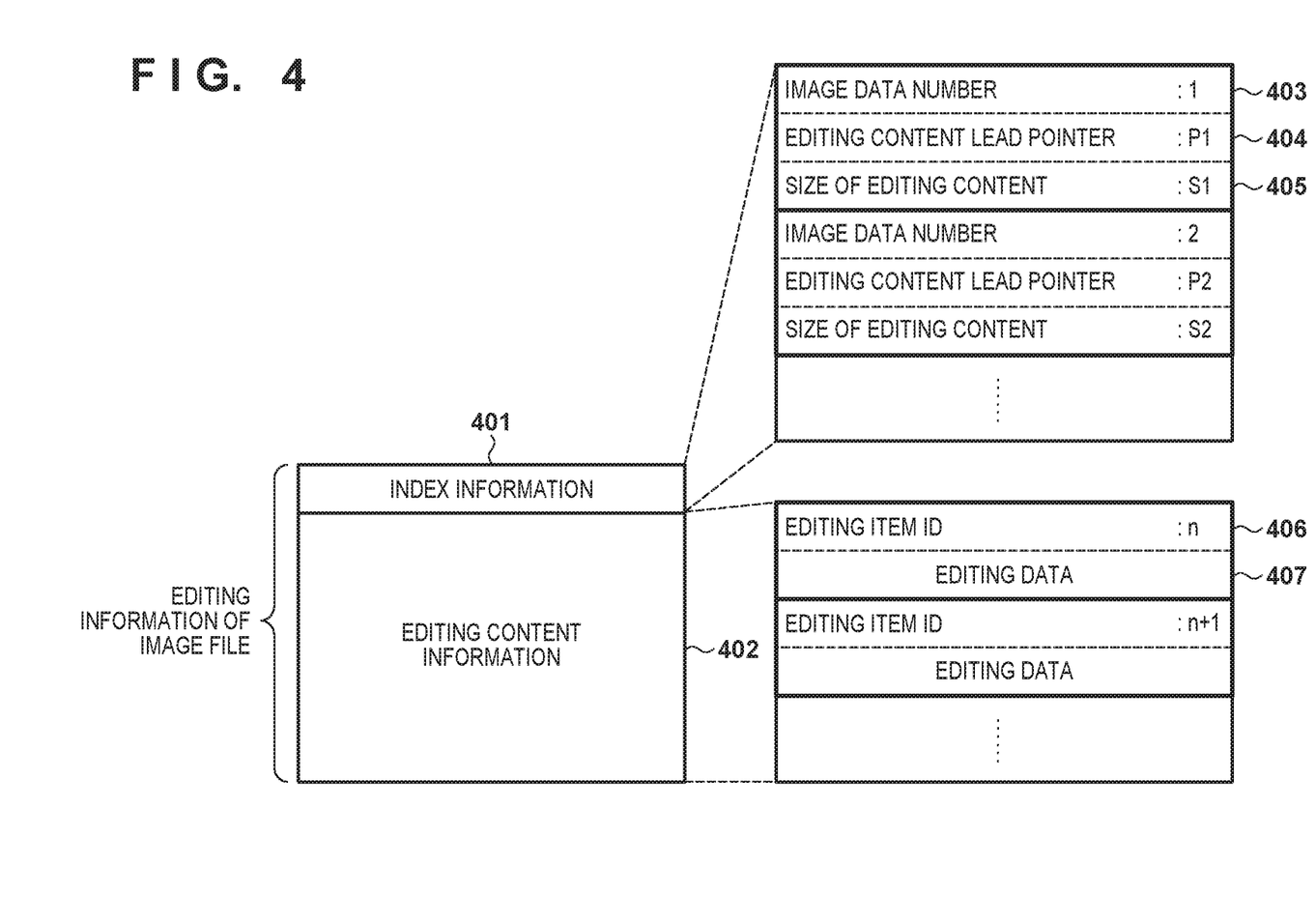
FIG. 4 is a view illustrating a configuration of an image file.

FIG. 4 illustrates an example of a configuration of editing information added to an image file. The editing information recorded in the RAM 103 is configured by index information 401 which is for comprehensively managing editing content of the respective image data and editing content information 402 which includes the editing content for a plurality of pieces of image data. Extraction of the editing content of a particular piece of image data in the selected image file is performed by referencing an editing content lead pointer 404 and a size 405 of the editing content which are recorded linked to an image data number 403 corresponding to a specific piece of image data in the index information 401. The editing content extracting unit 202 extracts a set (pair) of: {an editing item ID 406 which represents an editing type; and the editing data 407 which represents a parameter of a format specialized to that editing type} as the editing information of the particular piece of image data.

Note that, as describe previously, no editing information exists in the case where the image file that was selected this time is being edited for the first time. In such a case, when the index information 401 is allocated in the RAM 103, information by which it is possible to distinguish an actual pointer is stored as an editing content pointer for all of the pieces of image data, and the sizes are made to be 0.

<Target Image Data Editing Processing>

In step 303 of FIG. 3, the edit processing unit 203 edits each piece of image data recorded in the RAM 103 in accordance with the respective editing content. This is to reproduce an image that represents the result of editing the previous time. Also, the edit processing unit 203 displays the post-editing image data on the display unit 109 as initial image data for the editing this time. Also, the edit processing unit 203 executes additional editing processing in relation to image data selected in accordance with an instruction via the operation unit 110 by the user. Here, the editing process method for editing a single piece of image data will be described with reference to FIG. 5. It should be noted that the image data in the selected image file is not actually changed in the image editing described below.

Figure 5:
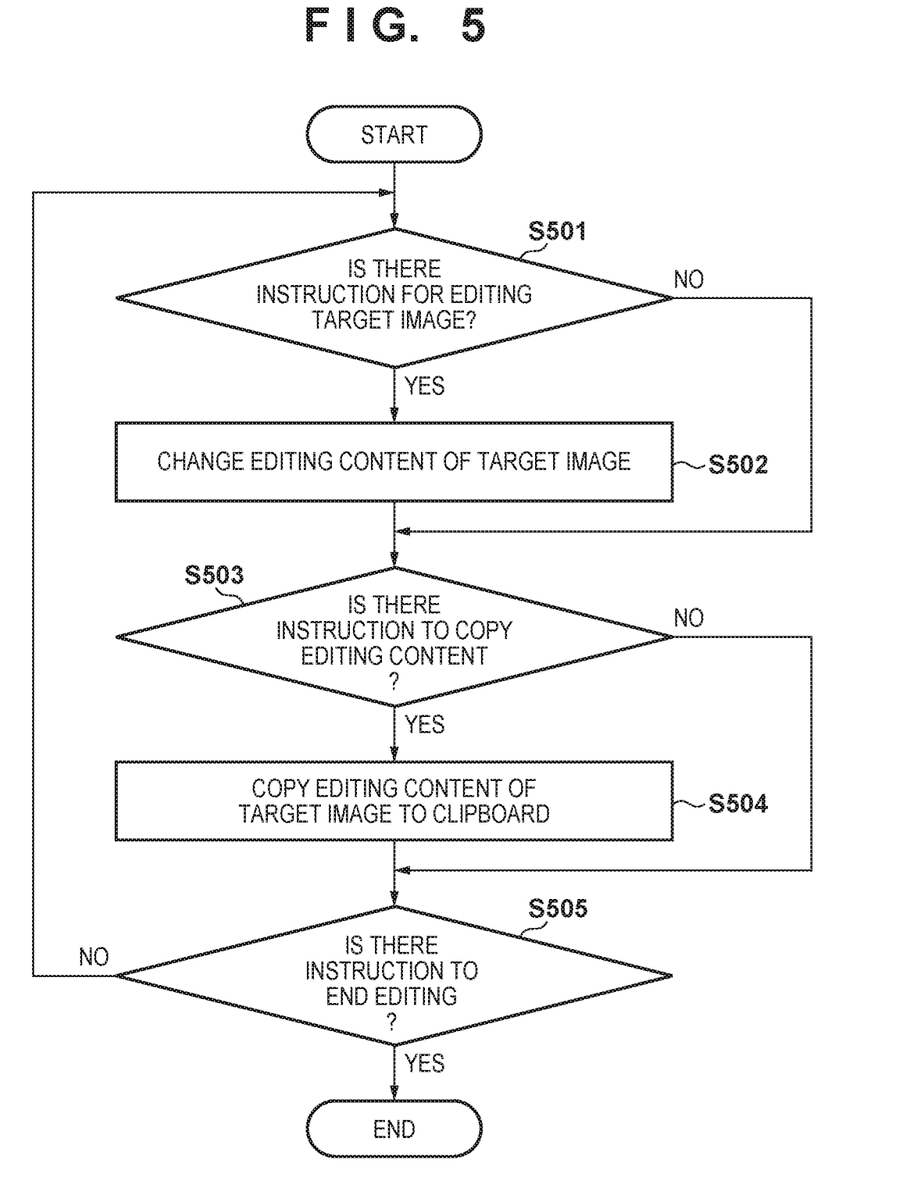
FIG. 5 is a flowchart illustrating an image data editing process procedure.

FIG. 5 is a view for illustrating a processing sequence for step 303 of the processing for editing the image data (image data of interest) that the user selected.

In step S501, the edit processing unit 203 determines whether there is an instruction for editing with respect to the image data of interest. In the case where it is determined that there is an editing instruction, the edit processing unit 203 advances the processing to step S502, and performs editing processing instructed in relation to the image data of interest, and updates the editing content of the image data of interest allocated in the RAM 103. In the editing processing performed here, editing processing according to information that indicates editing content which has been stored in a clipboard allocated in advance in the RAM 103 is included. Also, a process for returning to an original image for when generating an image file is included.

In step S503, the edit processing unit 203 determines whether there is an instruction to copy the editing content for other image data to the image data of interest. This is a determination for optimizing work when editing in the same way in relation to a plurality of pieces of image data included in a single selected image file. In a case where it is determined that there is an instruction to copy editing content, the edit processing unit 203 advances the processing to step S504, and copies all of the editing content corresponding to the image data of interest to a clipboard. Accordingly, in processing for editing other image data, the user can collectively reflect all editing content performed in the image data of interest.

In step S505, the image editing unit 200 determines whether or not there is an instruction to end the editing. In the case of no, the image editing unit 200 returns the processing to step S501, and repeats the foregoing processing.

<Editing Content Reconstruction Processing>

In step S304 of FIG. 3, the reconstruction processing unit 204 performs reconstruction processing for recording the editing content of target image data recorded in the RAM 103 as editing information for the selected image file. Here, the reconstruction processing method for the editing content corresponding to a single piece of image data of interest is described with reference to FIG. 6. It should be understood that in practice, the processing described below is performed for each piece of image data since a plurality of pieces of image data are included in a selected image file.

Figure 6:
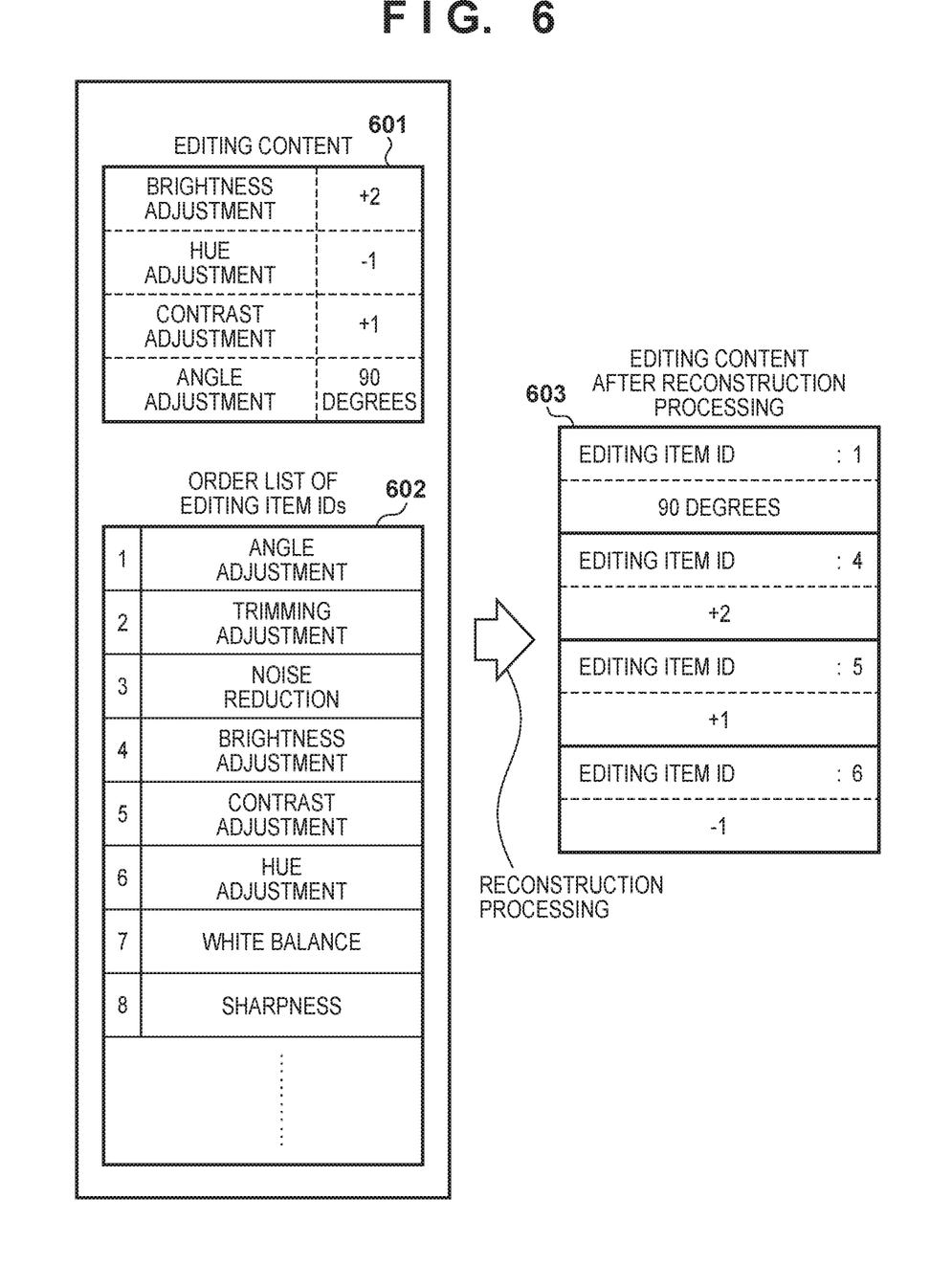
FIG. 6 is a flowchart illustrating a processing procedure for reconstruction of editing content.

The reconstruction processing unit 204 references editing content 601 for the image data of interest and an order list 602 for predetermined editing item IDs, which are recorded in the RAM 103, and generates one set of editing content information 603 in which pairs editing item IDs and parameters corresponding to those editing items are concatenated for each of the edited items.

Note that the order list 602 of editing item IDs is only one example for describing the reconstruction processing, and the editing content may be reconstructed in accordance with other rules.

<Image File Editing Information Recording>

In step 305 of FIG. 3, the editing information recording unit 205 records editing information for the selected image file by using the editing content information after the reconstruction processing for each piece of image data recorded in the RAM 103. Here, the selected image file editing information recording method will be described with reference to FIG. 7.

Figure 7:
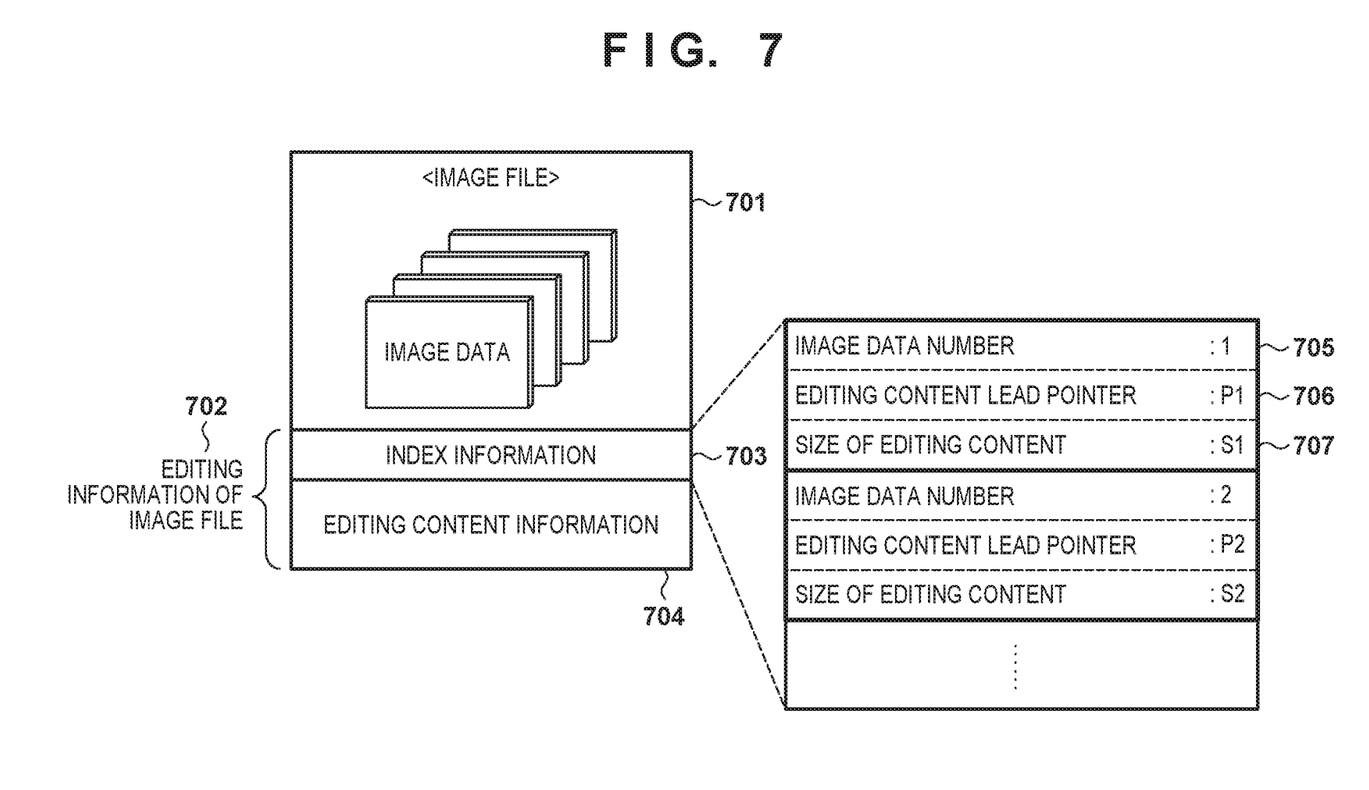
FIG. 7 is a view for describing an image file editing information recording process.

In FIG. 7, editing information 702 representing the editing content this time is recorded in the selected image file 701, the editing information recording unit 205 first overwrites the editing content information for each piece of image data recorded in the RAM 103 immediately after index information 703 of the selected image file 701.

Note that in the case where there this is the first editing process on the selected image file 701, there is no index information 703 in the first place. Accordingly, the editing information recording unit 205 adds, to the end of the selected image file, index information of an amount proportional to the number of pieces of image data included in the selected image file, and following that adds editing content information for each piece of image data recorded in the RAM 103. Also, at that time, the editing information recording unit 205 rewrites the flag so as to represent that there is editing information in the file header of the selected image file, and stores the address of the index information.

Next, the editing information recording unit 205 updates an editing content lead pointer 706 and a size 707 of the editing content which have been recorded linked to an image data number 705 corresponding to the respective image data and which are included in the index information 703 of the selected image file 701.

As described above, by virtue of the present embodiment, even if a plurality of pieces of original image data have been recorded in a single image file, it is possible to maintain the pre-editing original image file as is, and record the original image data editing information in that image file as well.

Note that in the above-described embodiment, the index information 703 added to the image file is described as having three items: {the image data number; the editing content lead pointer; and the editing content size} for one piece of image data. In the case where the index information 703 is allocated for each image included in the image file, the image data number may be omitted if a commitment is made for the number of the image data to follow the ascending order of 1, 2, . . . .

However, if the index information 703 is to be made to be for only image data for which there is an editing history, the foregoing image data number is necessary.

Note that in the present embodiment, an example in which the image editing unit is applied to the image capturing apparatus is described, but the present invention may be applied in other apparatuses as well. For example, it may be applied in a playback apparatus or in the image managing apparatus.

Also, in the embodiment, as a configuration of the image file editing information, the index information and the editing content information are described; however, the present invention may be applied with other configurations as well. For example, the editing information may be made to be only the editing content information.

Also, in the embodiment, the editing information is reconstructed prior to recording the image file editing information, but the present invention may be applied in a case where the editing information is recorded in a state in which it has not been reconstructed.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-176649, filed Sep. 14, 2017, which is hereby incorporated by reference herein in its entirety.

What is claimed is:

1. An image processing apparatus that performs editing processing in relation to an image file in which a plurality of original images is included, the apparatus comprising:
   a processor; and
   a memory storing a program which causes the processor to function as:
   an editing unit configured to edit an original image selected, as a target of editing, among a plurality of original images included in an image file to be edited and generate editing information for reproducing a post-editing image from the original image; and
   a recording unit configured to record, in the image file to be edited, the editing information generated by the editing unit,
   wherein the editing information includes index information indicating an image data number of the original image as the target of editing and editing content information identifying an edit applied to the original image as the target of editing,
   wherein the editing unit generates, for each original image, the index information and the editing content information, and
   the recording unit records the editing information so as to continue from the end of the image file to be edited.

2. The apparatus according to claim 1, wherein the editing unit generates a plurality of pieces of editing information respectively corresponding to a plurality of original images that are editing targets, and
   the recording unit records, at the end of the image file, the generated plurality of pieces of editing information corresponding to the plurality of original images.

3. The apparatus according to claim 1, wherein the editing unit includes a processing unit that, in accordance with the editing information corresponding to one original image in the image file, edits other original images included in the image file.

4. The apparatus according to claim 1, further comprising:
   an image sensor;
   wherein the recording unit records, as a single image file in a recording medium, a plurality of images obtained by consecutively capturing by the image sensor, and
   wherein the editing unit edits the image file recorded in the recording medium.

5. The apparatus according to claim 4, wherein when the plurality of images obtained by consecutively capturing is recorded as the single image file, the recording unit records, in a file header:
   as information for determining an existence or absence of editing information, information representing that there is no editing information; and
   as an address for editing information, dummy information of a predetermined size.

6. The apparatus according to claim 5, the program further causes the processor to function as:
   a determination unit configured to analyze a header of an image file that is an editing target, and determine whether or not the editing information has been added; and
   a generation unit configured to, in a case where it is determined by the determination unit that the editing information has not been added, generate an image that is a target of initial editing by the editing unit by editing in accordance with the editing information from the plurality of original images included in the image file that is the editing target.

7. A method for controlling an image processing apparatus that performs editing processing in relation to an image file in which a plurality of original images is included, the method comprising:
   (a) editing an original image selected, as a target of editing, among a plurality of original images included in an image file to be edited and generating editing information for reproducing a post-editing image from the original image; and
   (b) recording, in the image file to be edited, the editing information generated in the editing,
   wherein the editing information includes index information indicating an image data number of the original image as the target of editing and editing content information identifying an edit applied to the original image as the target of editing,
   wherein the editing (a) generates, for each original image, the index information and the editing content information, and
   the recording (b) records the editing information so as to continue from the end of the image file to be edited.

8. A non-transitory computer-readable storage medium storing a program which, when read and executed by a computer, causes the computer to performs the steps of a method for controlling an image processing apparatus that performs editing processing in relation to an image file in which a plurality of original images is included, the method comprising:
   (a) editing an original image selected as a target of editing, among a plurality of original images included in an image file to be edited and generating editing information for reproducing a post-editing image from the original image; and (b) recording, in the image file to be edited, the editing information generated in the editing wherein the editing information includes index information indicating an image data number of the original image as the target of editing and editing content information identifying an edit applied to the original image as the target of editing, wherein the editing (a) generates, for each original image, the index information and the editing content information, the recording (b) records the editing information so as to continue from the end of the image file to be edited.

9. The apparatus according to claim 1, wherein the index information includes pointer information for addressing the edit content information corresponding to the image number, wherein the recording unit records the edited content information of the plurality of original images after the index information of the plurality of original images.

* * * * *